United States Patent
Miyamoto et al.

(10) Patent No.: US 12,184,080 B2
(45) Date of Patent: Dec. 31, 2024

(54) WIRELESS POWER SUPPLY UNIT AND WIRELESS POWER TRANSMISSION SYSTEM

(71) Applicant: PANASONIC INTELLECTUAL PROPERTY MANAGEMENT CO., LTD., Osaka (JP)

(72) Inventors: Hideaki Miyamoto, Osaka (JP); Eiji Takahashi, Nara (JP); Tsutomu Sakata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/255,976

(22) PCT Filed: Dec. 9, 2020

(86) PCT No.: PCT/JP2020/045915
§ 371 (c)(1),
(2) Date: Jun. 5, 2023

(87) PCT Pub. No.: WO2022/123704
PCT Pub. Date: Jun. 16, 2022

(65) Prior Publication Data
US 2024/0039331 A1    Feb. 1, 2024

(51) Int. Cl.
*B60L 11/18*    (2006.01)
*B60L 53/12*    (2019.01)
(Continued)

(52) U.S. Cl.
CPC ............ *H02J 50/005* (2020.01); *B60L 53/12* (2019.02); *H01F 27/36* (2013.01); *H01F 38/14* (2013.01);
(Continued)

(58) Field of Classification Search
CPC .................................. H02J 50/10; H02J 50/90
See application file for complete search history.

(56) References Cited

U.S. PATENT DOCUMENTS

| | | | |
|---|---|---|---|
| 2012/0242447 A1 | 9/2012 | Ichikawa et al. | |
| 2015/0061583 A1* | 3/2015 | Nakamura | H01F 27/363 320/108 |

(Continued)

FOREIGN PATENT DOCUMENTS

| | | | |
|---|---|---|---|
| JP | 2014-036545 A | 2/2014 | |
| JP | 2014-113021 A | 6/2014 | |

(Continued)

OTHER PUBLICATIONS

International Search Report dated Mar. 9, 2021 issued in International Patent Application No. PCT/JP2020/045915 with English translation.

*Primary Examiner* — Jared Fureman
*Assistant Examiner* — Esayas G Yeshaw
(74) *Attorney, Agent, or Firm* — Rimon P.C.

(57) ABSTRACT

A wireless power supply unit includes: a power transmitting coil; and a power receiving coil that wirelessly receives electric power from the power transmitting coil. One of the power transmitting coil and the power receiving coil is shaped so that, during use, a central portion thereof is located beyond an outer peripheral portion thereof, as viewed from another one of the power transmitting coil and the power receiving coil.

16 Claims, 17 Drawing Sheets

(51) Int. Cl.
  *H01F 27/36* (2006.01)
  *H01F 38/14* (2006.01)
  *H02J 50/00* (2016.01)
  *H02J 50/10* (2016.01)
  *H02J 50/70* (2016.01)
  *H02J 50/90* (2016.01)
(52) U.S. Cl.
  CPC .............. *H02J 50/10* (2016.02); *H02J 50/70* (2016.02); *H02J 50/90* (2016.02)

(56) References Cited

U.S. PATENT DOCUMENTS

| | | |
|---|---|---|
| 2015/0244181 A1 | 8/2015 | Kagami et al. |
| 2015/0263528 A1 | 9/2015 | Kitamura et al. |
| 2016/0276871 A1 | 9/2016 | Schmitz et al. |
| 2016/0355094 A1* | 12/2016 | Yamakawa ........... H02J 7/0042 |
| 2019/0304678 A1* | 10/2019 | Murashige ............... H04B 5/26 |
| 2021/0300192 A1* | 9/2021 | Cho ........................ B60L 53/12 |

FOREIGN PATENT DOCUMENTS

| | | |
|---|---|---|
| JP | 2014-230441 A | 12/2014 |
| JP | 2015-192521 A | 11/2015 |
| JP | 2016-174149 A | 9/2016 |
| JP | 2019-004531 A | 1/2019 |
| WO | 2011/074091 A1 | 6/2011 |

\* cited by examiner

WIRELESS POWER SUPPLY UNIT AND WIRELESS POWER TRANSMISSION SYSTEM

CROSS-REFERENCE OF RELATED APPLICATIONS

This application is the U.S. National Phase under 35 U.S.C. § 371 of International Patent Application No. PCT/JP2020/045915, filed on Dec. 9, 2020, the entire disclosure of which Application is incorporated by reference herein.

TECHNICAL FIELD

The present disclosure relates to a wireless power supply unit and a wireless power transmission system.

BACKGROUND ART

Recent years have seen development of wireless power transmission techniques for wirelessly transmitting electric power to electric vehicles such as electric automobiles or mobile devices such as smartphones. For example, Patent Document 1 discloses an example of a wireless power transmission system that utilizes inductive coupling between coils. The device disclosed in Patent Document 1 wirelessly transmits energy between two objects that undergo relative rotation with respect to each other around an axis of rotation. This device includes a power transmitting coil that performs energy transmission via inductive coupling, and a power receiving coil that is opposed to the power transmitting coil. While the two coils are opposed to each other in proximity, energy is transmitted from the power transmitting coil to the power receiving coil.

CITATION LIST

Patent Literature

[Patent Document 1] Japanese Laid-Open Patent Publication No. 2016-174149

SUMMARY OF INVENTION

Technical Problem

In a wireless power transmission system that utilizes inductive coupling between coils, the efficiency of power transmission is reduced when the center axis of a power transmitting coil and the center axis of a power receiving coil are misaligned.

The present disclosure provides a technique for reducing a decrease in the efficiency of power transmission when the center axis of the power transmitting coil and the center axis of the power receiving coil are misaligned.

Solution to Problem

A wireless power supply unit according to an implementation of the present disclosure includes a power transmitting coil and a power receiving coil that wirelessly receives electric power from the power transmitting coil. One of the power transmitting coil and the power receiving coil is shaped so that, during use, a central portion thereof is located beyond an outer peripheral portion thereof, as viewed from another one of the power transmitting coil and the power receiving coil.

General or specific aspects of the present disclosure may be implemented using an apparatus, a system, a method, an integrated circuit, a computer program, or a storage medium, or any combination of an apparatus, a system, a method, an integrated circuit, a computer program, and/or a storage medium.

Advantageous Effects of Invention

According to embodiments of the present disclosure, it is possible to reduce a decrease in the efficiency of power transmission when the center axis of a power transmitting coil and the center axis of a power receiving coil are misaligned.

DESCRIPTION OF EMBODIMENTS

Prior to describing specific embodiments of the present disclosure, findings providing the basis of the present disclosure will be described.

Figure 1A:
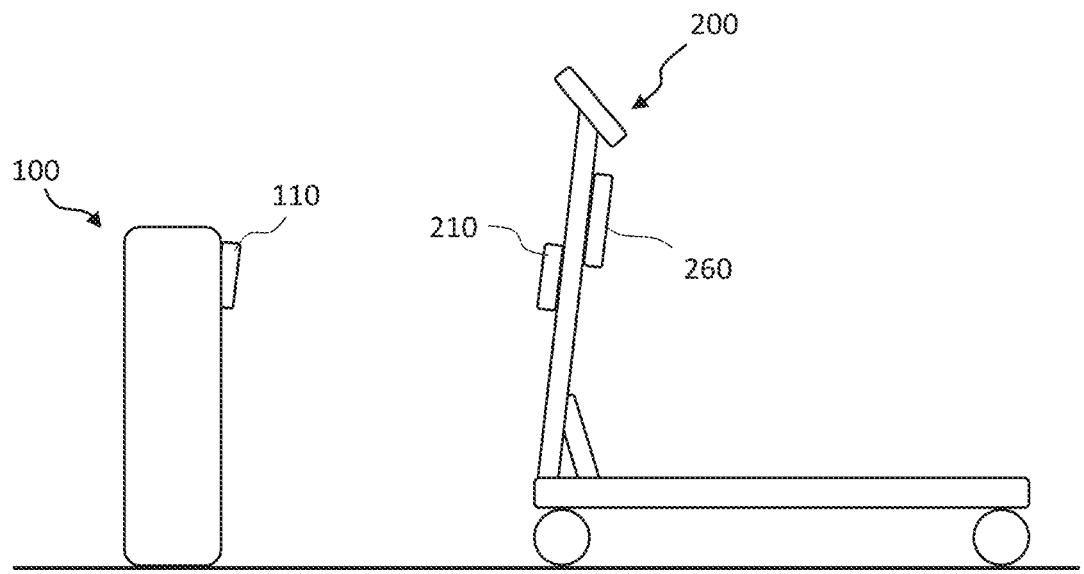
FIG. 1A A diagram showing a schematic configuration of an illustrative wireless power transmission system.

FIG. 1A is a diagram showing a schematic configuration of an illustrative wireless power transmission system. The wireless power transmission system shown in FIG. 1A includes a charging station 100 and an electric scooter 200. A power transmission unit 110 is provided in the charging station 100. A power reception unit 210 and a battery 260 are provided in the electric scooter 200. Electric power is wirelessly transmitted from the power transmission unit 110 of the charging station 100 to the power reception unit 210 of the electric scooter 200. This system may be used in a shared mobility service for renting the electric scooter 200 out to users, for example.

The power transmission unit 110 includes a power transmitting coil and a power transmitting circuit that supplies AC power to the power transmitting coil. The power reception unit 210 includes: a power receiving coil to receive the electric power that is sent out from the power transmitting coil; and a power receiving circuit to convert the electric power received by the power receiving coil into another form of electric power, e.g., DC power, and supply it to a load such as the battery 260.

Figure 1B:
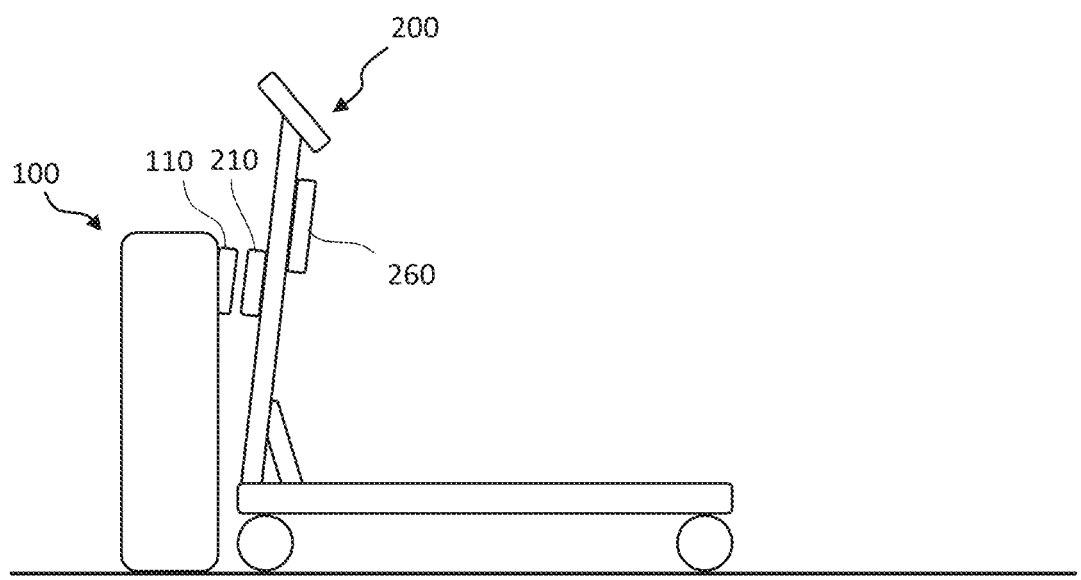
FIG. 1B A diagram showing a power reception unit being placed close to a power transmission unit.

FIG. 1B is a diagram showing the power reception unit 210 being placed close to the power transmission unit 110 in order to supply power from the charging station 100 to the electric scooter 200. As depicted in this figure, in order to charge the battery 260 of the electric scooter 200, the user places the power reception unit 210 of the electric scooter 200 close to the power transmission unit 110 of the charging station 100. As a result of this, the power receiving coil in the power reception unit 210 is opposed to the power transmitting coil in the power transmission unit 110. In this state, the power transmitting circuit supplies AC power to the power transmitting coil. Then, via magnetic coupling or inductive coupling between the power transmitting coil and the power receiving coil, electric power is wirelessly transmitted from the power transmitting coil to the power receiving coil. The electric power received by the power receiving coil is converted as appropriate by the power receiving circuit that is connected to the power receiving coil, and then is supplied to the battery 260. As a result, charging of the battery 260 is begun.

Figure 2A:
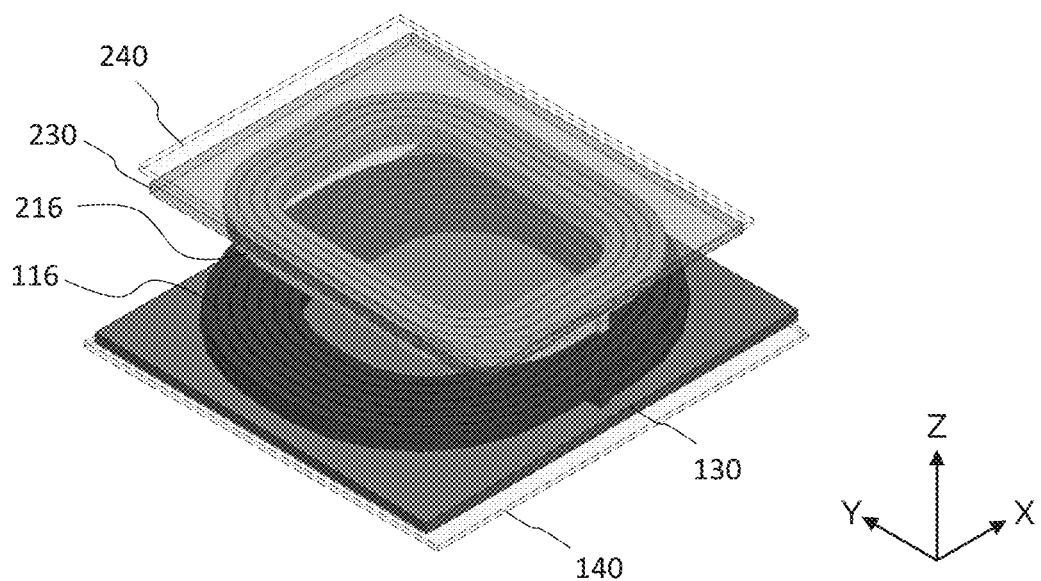
FIG. 2A A diagram showing an exemplary configuration of a wireless power supply unit.
Figure 2B:
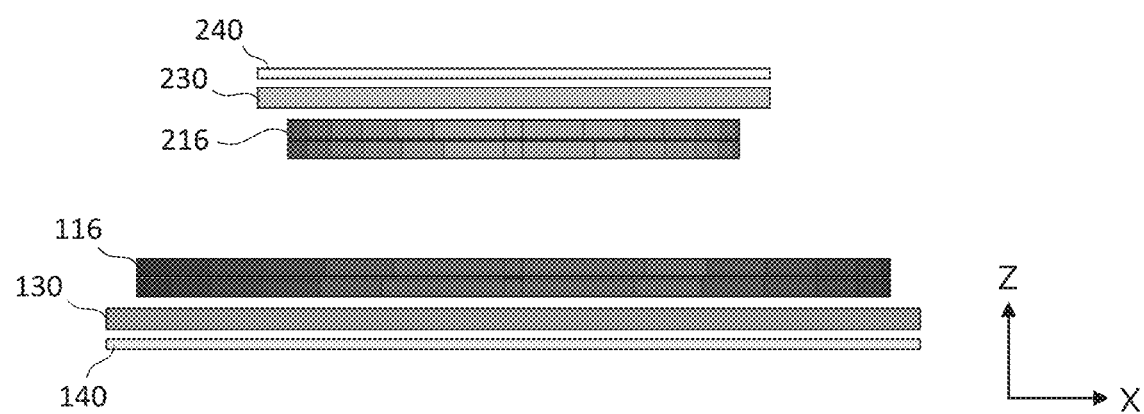
FIG. 2B A diagram showing a cross section of the wireless power supply unit shown in FIG. 2A, as taken parallel to the XZ plane.

FIG. 2A is a diagram showing an exemplary configuration of a wireless power supply unit including a power transmitting coil 116 and a power receiving coil 216. FIG. 2A shows XYZ coordinates indicating X, Y and Z directions which are orthogonal to one another. The following description relies on the XYZ coordinates as shown. FIG. 2B is a diagram showing a cross section of the wireless power supply unit shown in FIG. 2A, as taken parallel to the XZ plane.

In the example shown in FIG. 2A and FIG. 2B, each of the power transmitting coil 120 and the power receiving coil 216 is a planar spiral coil. Each of the power transmitting coil 120 and the power receiving coil 216 has electrically-conductive windings that are wound around its center axis in planar fashion. This wireless power supply unit also includes magnetic shields 130 and 230 and electrical conduction shields 140 and 240. In the power transmission unit 110, the following are stacked in this order: the electrical conduction shield 140, the magnetic shield 130, and the power transmitting coil 116. In the power reception unit 210, the following are stacked in this order: the electrical conduction shield 240, the magnetic shield 230, and the power receiving coil 216. During power transmission, the power receiving coil 216 is opposed to the power transmitting coil 116. In this state, the magnetic shields 130 and 230 and the electrical conduction shields 140 and 240 are located outside the power transmitting coil 116 and the power receiving coil 216.

At an opposite side to the side where the power receiving coil 216 is located, the magnetic shield 130 of the power-transmitting side is placed close to the power transmitting coil 116. At an opposite side to the side where the power transmitting coil 116 is located, the magnetic shield 230 of the power-receiving side is placed close to the power receiving coil 216. The magnetic shields 130 and 230 may be made of a ferromagnetic material, such as ferrite. The magnetic shields 130 and 230 improve the degree of coupling between the power transmitting coil 116 and the power receiving coil 216.

The electrical conduction shields 140 and 240 are disposed outside the magnetic shield 130, the power transmitting coil 116, the power receiving coil 216, and the magnetic shield 230. The electrical conduction shields 140 and 240 may be made of an electrically-conductive material, e.g., aluminum or copper. The electrical conduction shields 140 and 240 suppress a magnetic field leakage that may occur around the power transmitting coil 116 and the power receiving coil 216 during power transmission.

In the above-described wireless power transmission system, in order to transmit electric power with a high efficiency, it is important that power transmission takes place while a high coupling efficiency exists between the power transmitting coil 116 and the power receiving coil 216. The coupling efficiency becomes maximum when the power transmitting coil 116 and the power receiving coil 216 are opposed in proximity and the center axes of these coils coincide. When the center axis of the power transmitting coil 116 and the center axis of the power receiving coil 216 are misaligned, the coupling coefficient between the coils decreases, thereby lowering the efficiency of power transmission.

Figure 3A:
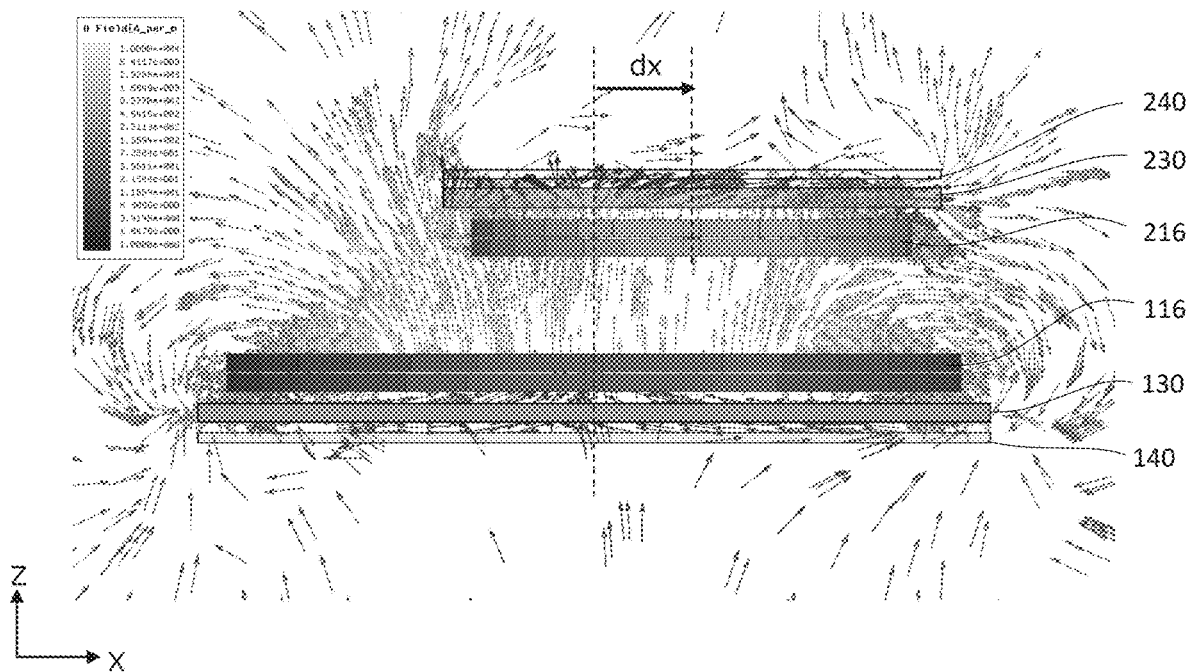
FIG. 3A a diagram showing an example spatial distribution of a magnetic field in the case where the center axis of a power receiving coil is misaligned from the center axis of a power transmitting coil.

FIG. 3A is a diagram showing an example spatial distribution of a magnetic field in the case where the center axis of the power receiving coil 216 is misaligned by dx in the x direction from the center axis of the power transmitting coil 116. The broken lines in the figure represent the respective center axes of the power transmitting coil 116 and the power receiving coil 216. FIG. 3A expresses a distribution of magnetic field intensity with arrows, where thinner arrows represent a higher magnetic field intensity. Note that the illustrated magnetic field distribution was obtained through an electromagnetic field analysis which was performed by setting the respective dimensions, magnetic permeabilities, dielectric constants, currents or other parameters of the power transmitting coil 116, the power receiving coil 216, the magnetic shields 130 and 230, and the electrical conduction shields 140 and 240 to their actually-used values. FIG. 3A shows exemplary results where dx=10 mm. As can be seen from FIG. 3A, when the center axis of the power transmitting coil 116 and the center axis of the power receiving coil 216 are misaligned, the magnetic flux that is captured by the power receiving coil 216 decreases, and the magnetic flux leaking outside increases.

Figure 3B:
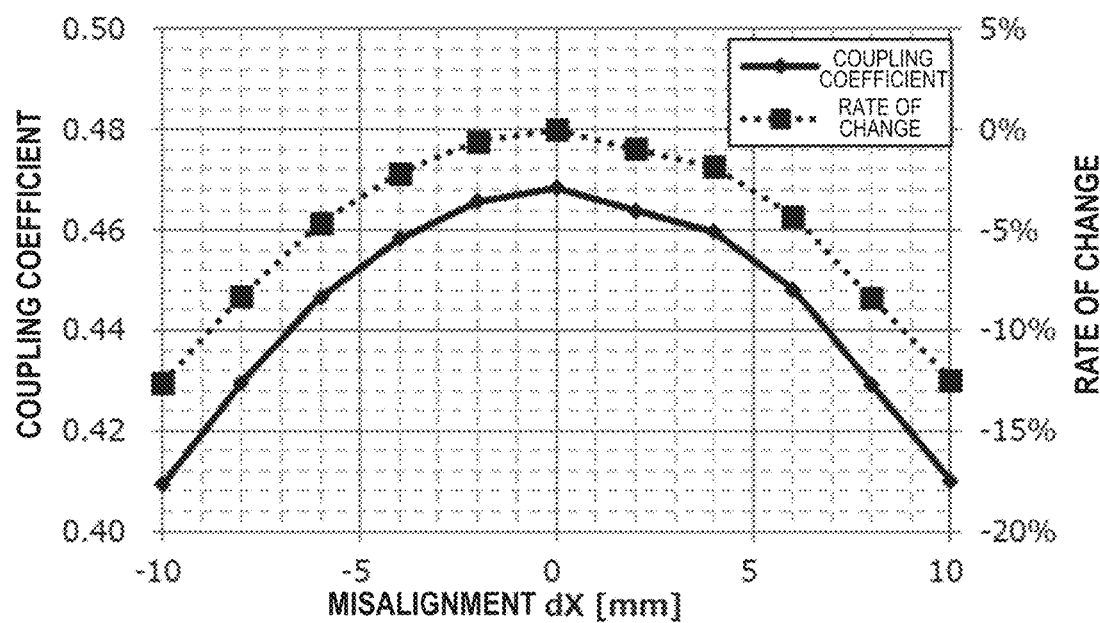
FIG. 3B A graph showing an example relationship between the coupling coefficient between the power transmitting coil and the power receiving coil and the amount of misalignment dx.

FIG. 3B is a graph showing an example relationship between the coupling coefficient between the power transmitting coil 116 and the power receiving coil 216 and the amount of misalignment dx. FIG. 3B also shows a rate of change in the coupling coefficient relative to the value of the coupling coefficient of the case where dx=0. As can be seen from this graph, the higher the absolute value of the amount of misalignment dx is, the lower the coupling efficiency between the coils is. For example, when a state of dx=0 mm transitions to a state of dx=10 mm, the coupling coefficient changes from 0.47 to 0.41, resulting in a decrease by about 13%. Similar results are also obtained when the position of the power receiving coil 216 with respect to the power transmitting coil 116 changes in the y direction. Thus, when the relative positioning between the coils becomes misaligned from the proper positioning, the coupling coefficient lowers, resulting in a decrease in the efficiency of power transmission.

Thus, in order to transmit electric power with a high efficiency, it is important that the position of the power transmitting coil 116 and the position of the power receiving coil 216 are appropriately matched. However, in a system for supplying power to an electric vehicle such as the electric scooter 200 shown in FIG. 1A, it is difficult to require the user to achieve a precise alignment between the power transmitting coil 116 and the power receiving coil 216. For example, in a sharing service of the electric scooter 200, a precise alignment between the power transmitting coil 116 and the power receiving coil 216 cannot be expected of the user when returning the electric scooter 200. In a sharing service, convenience of the user is a priority. Asking the user for a precise alignment between the coils will detract from such convenience.

Based on the above thoughts, the inventors have sought for configurations for solving the above problems. The inventors have conceived that, by forming at least one of the power transmitting coil and the power receiving coil in a shape that approximates a curved surface, it is possible to reduce a decrease in the coupling coefficient between the coils in the case of a misalignment between the coils. Hereinafter, outlines of embodiments of the present disclosure will be described.

A wireless power supply unit according to an illustrative embodiment of the present disclosure includes: a power transmitting coil; and a power receiving coil that wirelessly receives electric power from the power transmitting coil. One of the power transmitting coil and the power receiving coil (referred to as a "first coil") is shaped so that, during use, its central portion is located beyond its outer peripheral portion, as viewed from another one of the power transmitting coil and the power receiving coil (referred to as a "second coil").

In accordance with the above configuration, the first coil is shaped so that, as viewed from the second coil, its central portion is located beyond its outer peripheral portion. The first coil having the aforementioned shape allows for reducing a decrease in the coupling coefficient between the coils when the center axis of the first coil and the center axis of the second coil are misaligned. As a result, a decrease in the efficiency of power transmission can be reduced.

The second coil may be shaped so that, during use, a central portion thereof is located in front of an outer peripheral portion thereof, as viewed from the first coil. Alternatively, the second coil may have a planar shape.

During use, at least a central portion of the second coil may be located inside a region that is defined by a wiring line of the first coil. As used herein, a "region that is defined by the wiring line of a coil" means a region that is surrounded by the wiring line of the coil and a plane containing an outer peripheral portion of the coil. In other words, during use, at least a central portion of the second coil may be located beyond the central portion of the first coil and in front of the outer peripheral portion of the first coil, as viewed from the first coil. During use, the entire second coil may be located beyond the central portion of the first coil and in front of the outer peripheral portion of the first coil, as viewed from the first coil.

The second coil may be equal in size to, or smaller in size than, the first coil.

The first coil may have a curved shape presenting a curved surface. Similarly, the second coil may have a curved shape presenting a curved surface.

The first coil may be the power transmitting coil, and the second coil may be the power receiving coil. Conversely, the first coil may be the power receiving coil, and the first coil may be the power receiving coil.

The wireless power supply unit may further include at least one of: a first magnetic shield that is disposed at an opposite side of the first coil to the side where the second coil is located; and a second magnetic shield that is disposed at an opposite side of the second coil to the side where the first coil is located. Providing such a magnetic shield(s) allows for increasing the coupling coefficient between the first coil and the second coil.

At least one of the first coil and the second coil may have a curved shape presenting a curved surface, and the at least one of the first magnetic shield and the second magnetic shield may have a shape that is curved along the first coil or the second coil.

The wireless power supply unit may further include at least one of: a first electrical conduction shield that is disposed at an opposite side of the first coil to the side where the second coil is located; and a second electrical conduction shield that is disposed at an opposite side of the second coil to the side where the first coil is located. Providing such an electrical conduction shield(s) allows for reducing a leakage of a magnetic field around the first coil and the second coil. In the case where the first magnetic shield is provided, the first electrical conduction shield may be provided outside the first magnetic shield. Similarly, in the case where the second magnetic shield is provided, the second electrical conduction shield may be provided outside the second magnetic shield.

At least one of the first coil and the second coil may have a curved shape presenting a curved surface, and the at least one of the first electrical conduction shield and the second electrical conduction shield may have a shape that is curved along the first coil or the second coil.

The at least one of the first electrical conduction shield and the second electrical conduction shield may have a box-like structure covering the first coil or the second coil. A single box-like electrical conduction shield covering the entirety of the first coil and the second coil may be provided. Providing the box-like electrical conduction shield allows for further reducing the leaking magnetic field.

The wireless power supply unit may further include a power transmitting circuit to supply AC power to the power transmitting coil.

The wireless power supply unit may further include a power receiving circuit to convert the electric power received by the power receiving coil into another form of electric power and to supply the other form of electric power to a load.

A wireless power transmission system according to another implementation of the present disclosure includes a power transmitting device including the power transmitting coil in any of the above wireless power supply units; and an electric vehicle including the power receiving coil.

Hereinafter, more specific embodiments of the present disclosure will be described. Note however that unnecessarily detailed descriptions may be omitted. For example, detailed descriptions on what is well known in the art or redundant descriptions on what is substantially the same configuration may be omitted. This is to avoid lengthy description, and facilitate the understanding of those skilled in the art. The accompanying drawings and the following description, which are provided by the present inventors so that those skilled in the art can sufficiently understand the present disclosure, are not intended to limit the scope of claims. In the following description, identical or similar constituent elements are denoted by identical reference numerals.

Embodiment 1

A wireless power transmission system according to an illustrative first embodiment of the present disclosure will be described.

The wireless power transmission system according to the present embodiment is similar in configuration to the system shown in FIG. 1A. That is, the wireless power transmission system includes: a charging station 100 as an example of a power transmitting device; and an electric scooter 200 as an example of an electric vehicle. The charging station 100 includes a power transmission unit 110. The power transmission unit 110 includes a power transmitting coil. The electric scooter 200 includes a power reception unit 210 and a battery 260. The electric scooter 200 also includes other component elements such as an electric motor not shown. The power reception unit 210 includes a power receiving coil. In the present embodiment, unlike in the configuration shown in FIG. 1A, the power transmitting coil and the power receiving coil have a structure in the form of a curved surface.

Figure 4A:
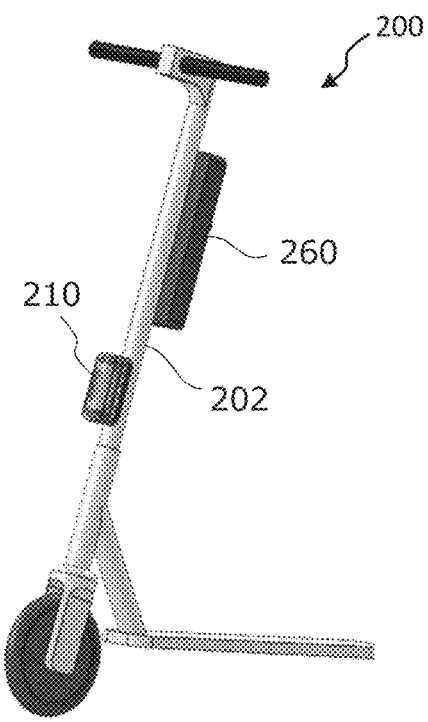
FIG. 4A A diagram showing an electric scooter according to Embodiment 1.

FIG. 4A is a diagram showing an example of the electric scooter 200 according to the present embodiment. The electric scooter 200 includes a shaft 202 that connects a front wheel and handle bars. The power reception unit 210 and the battery 260 are attached to the shaft 202.

Figure 4B:
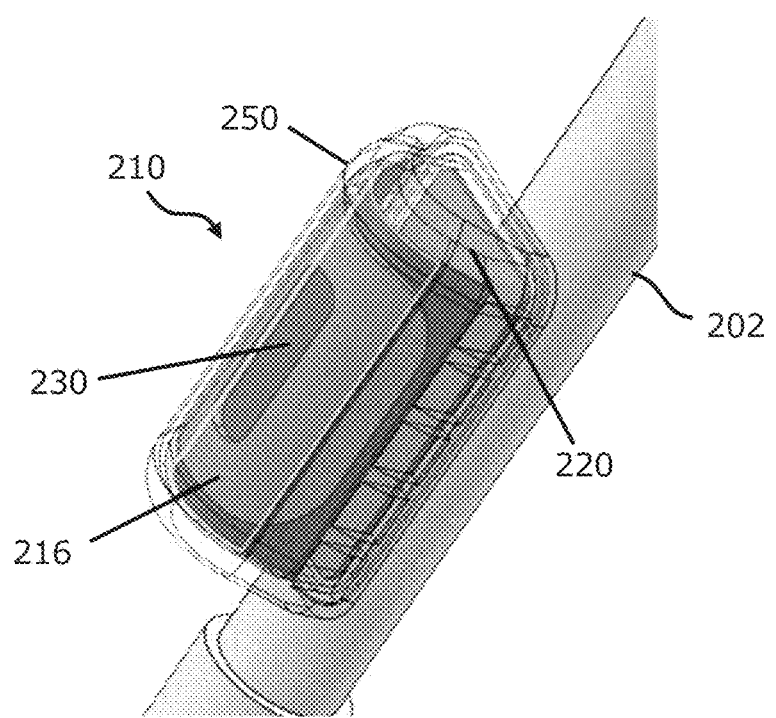
FIG. 4B A diagram showing the power reception unit enlarged.

FIG. 4B is a diagram showing the power reception unit 210 enlarged. The power reception unit 210 in this example includes a power receiving coil 216, a magnetic shield 230, a circuit board 220, and a cover 250. The power receiving coil 216 is a spiral coil having a curved shape presenting a curved surface. The magnetic shield 230 is disposed on the rear face side of the power receiving coil 216, i.e., the opposite side of its side that faces the power transmitting coil 116. The magnetic shield 230 is placed close to the power receiving coil 216. An air gap, or a gap of an electrical insulator other than air, may be provided between the magnetic shield 230 and the power receiving coil 216. The magnetic shield 230 contains a ferromagnetic material having high magnetic permeability, e.g., ferrite. Providing the magnetic shield 230 allows for increasing the coupling coefficient between the power transmitting coil 116 and the power receiving coil 216. On the circuit board 220, a power transmitting circuit that supplies AC power to the power transmitting coil 116 and a circuit that controls charging and discharging of the battery 260 may be provided, for example.

Figure 4C:
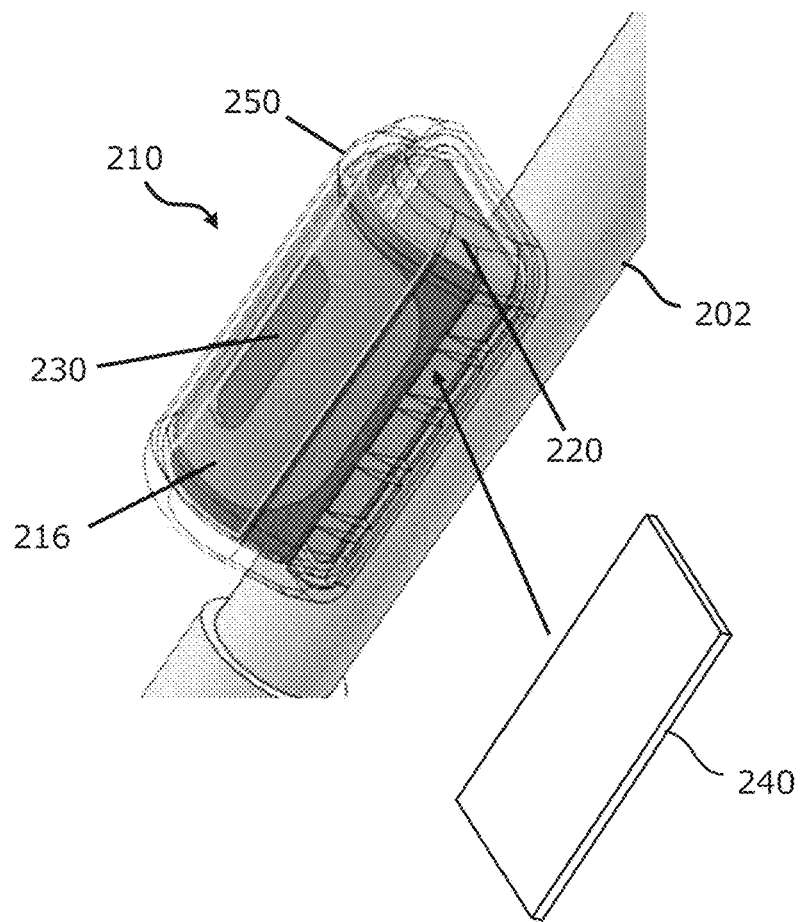
FIG. 4C A diagram showing an example where the power reception unit includes an electrical conduction shield.

As shown in FIG. 4C, the electrical conduction shield 240 may be disposed between the magnetic shield 230 and the circuit board 220. The electrical conduction shield 240 is composed of any electrically-conductive material such as aluminum or copper. By providing the electrical conduction shield 240 on the rear face side of the power receiving coil 216 and the magnetic shield 230 as in this example, leakage of a magnetic field occurring around the power receiving coil 216 during power transmission can be suppressed. The electrical conduction shield 240 shown in FIG. 4C has a plate shape. By adopting such a simple shape for the electrical conduction shield 240, the power reception unit 210 can be made light in weight. Similarly to the power receiving coil 216, the electrical conduction shield 240 may have a curved structure presenting a curved surface. Alternatively, a box-like structure may be provided that at least partially surrounds the power receiving coil 216 and the magnetic shield 230.

Figure 5:
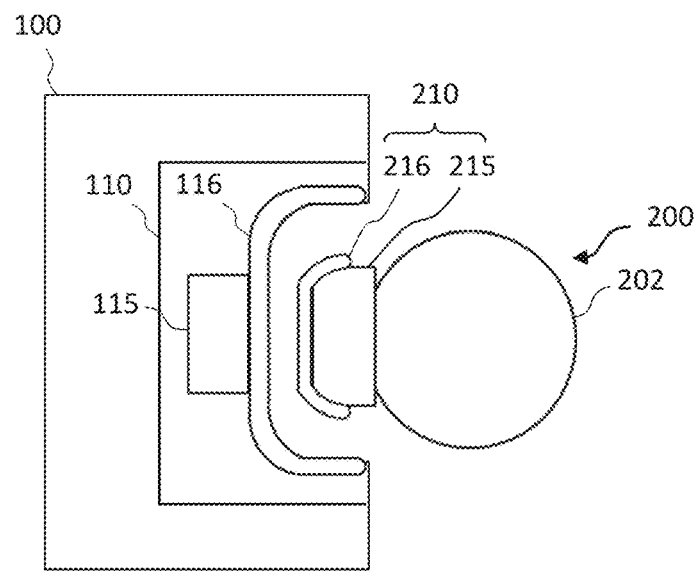
FIG. 5 A diagram schematically showing an example of relative positioning between the electric scooter and a charging station during charging.

FIG. 5 is a diagram schematically showing an example of relative positioning between the electric scooter 200 and the charging station 100 during charging. The power transmission unit 110 in this example includes: the power transmitting coil 116, which is a spiral coil that is curved in the form of a curved surface; and the power transmitting circuit 115 that supplies AC power to the power transmitting coil 116. The power reception unit 210 includes: the power receiving coil 216; and a power receiving circuit 215 that is connected to the power receiving coil 216. The power receiving coil 216 in this example is smaller than the power transmitting coil 116. In FIG. 5, the magnetic shield and the electrical conduction shield included in each of the power transmission unit 110 and the power reception unit 210 are omitted from illustration.

In the present embodiment, during charging, a part or a whole of the power receiving coil 216 is located inside a region that is defined by the wiring line of the power transmitting coil 116. In other words, when viewed from the power transmitting coil 116, a part or a whole of the power receiving coil 216 is beyond a central portion of the power transmitting coil 116 and in front of an outer peripheral portion of the power transmitting coil 116. With such a structure, it is possible to reduce a decrease in the coupling coefficient associated with changes in relative positioning between the power transmitting coil 116 and the power receiving coil 216.

Figure 6A:
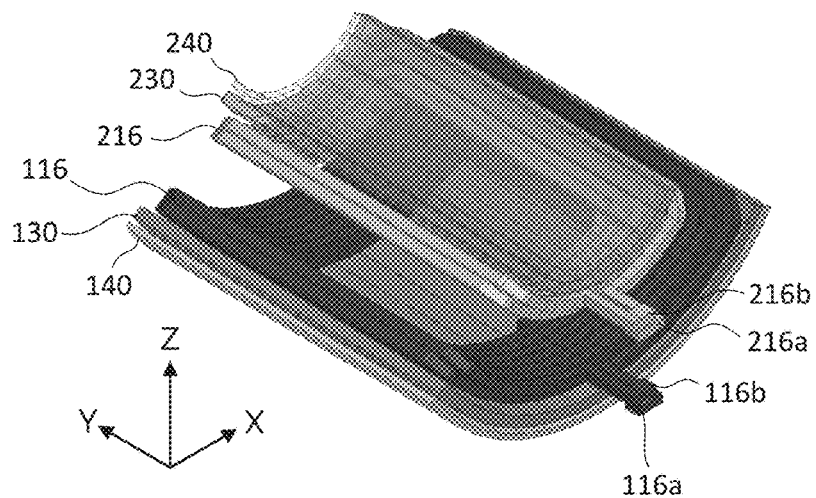
FIG. 6A A perspective view showing a more detailed structure of the wireless power supply unit according to Embodiment 1.

FIG. 6A is a perspective view showing an example of more detailed structure of the wireless power supply unit. In addition to the power transmitting coil 116 and the power receiving coil 216, the wireless power supply unit in this example includes the first magnetic shield 130, the second magnetic shield 230, the first electrical conduction shield 140, and the second electrical conduction shield 240.

The first magnetic shield 130 is disposed at an opposite side of the power transmitting coil 116 to the side where the power receiving coil 216 is located. The second magnetic shield 230 is disposed at an opposite side of the power receiving coil 216 to the side where the power transmitting coil 116 is located. The first magnetic shield 130 has a shape that is curved along the power transmitting coil 116. The second magnetic shield 230 has a shape that is curved along the power receiving coil 216.

The first electrical conduction shield 140 is disposed at an opposite side of the power transmitting coil 116 to the side where the power receiving coil 216 is located. More specifically, the first electrical conduction shield 140 is located outside the power transmitting coil 116 and the first magnetic shield 130. The second electrical conduction shield 240 is disposed at an opposite side of the power receiving coil 216 to the side where the power transmitting coil 116 is located. More specifically, the second electrical conduction shield 240 is located outside the power receiving coil 216 and the second magnetic shield 230. The first electrical conduction shield 140 has a shape that is curved along the power transmitting coil 116 and the first magnetic shield 130. The second electrical conduction shield 240 has a shape that is curved along the power receiving coil 216 and the second magnetic shield 230.

Both ends 116a and 116b of the power transmitting coil 116 are respectively connected to two terminals of the power transmitting circuit 115. Both ends 216a and 216b of the power receiving coil 216 are respectively connected to two terminals of the power receiving circuit 215. AC power is input to both ends 116a and 116b of the power transmitting coil 116.

Figure 6B:
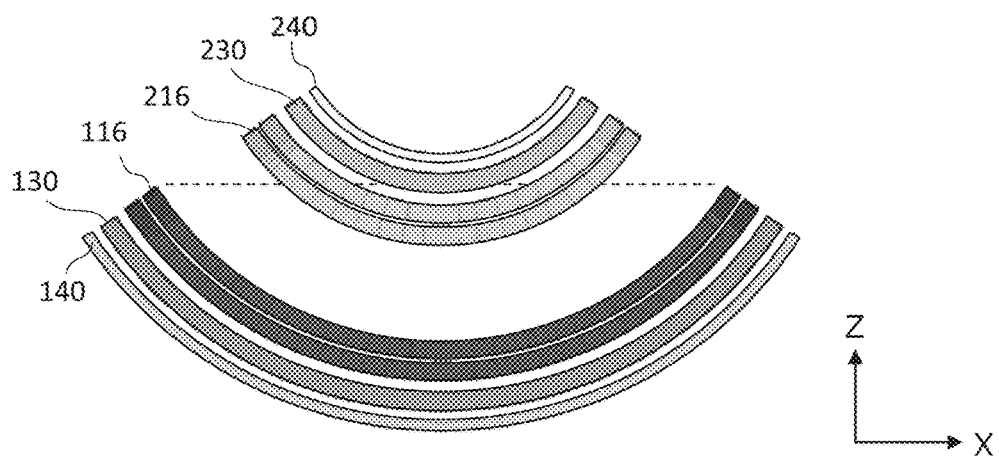
FIG. 6B A diagram showing the structure of a cross section of the wireless power supply unit shown in FIG. 6A.
Figure 6C:
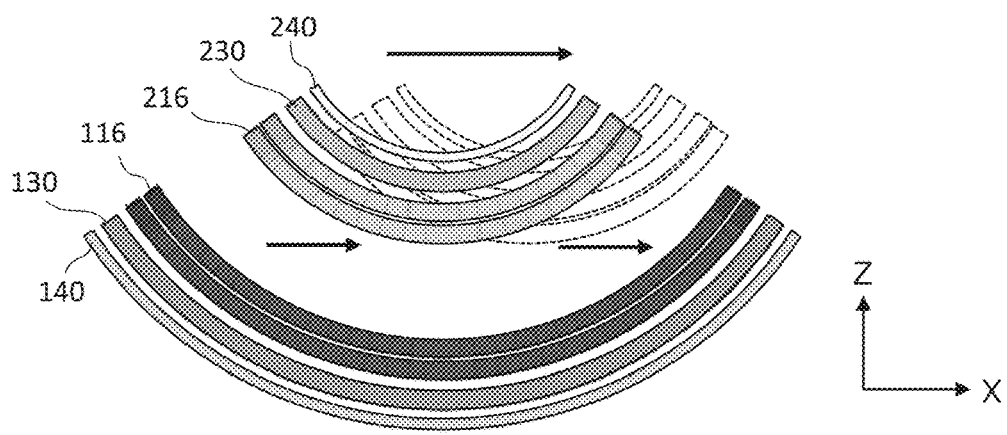
FIG. 6C A diagram showing an example state where the position of the power reception unit has changed in the X direction from the state shown in FIG. 6B.

FIG. 6B is a diagram showing the structure of a cross section of the wireless power supply unit shown in FIG. 6A. FIG. 6C is a diagram showing an example state where the position of the power reception unit 210 has changed in the X direction from the state shown in FIG. 6B. In the present embodiment, the power transmitting coil 116 and the power receiving coil 216 are curved, such that at least a central portion of the power receiving coil 216 is located inside a region that is defined by the wiring line of the power transmitting coil 116. Herein, a region that is defined by the wiring line of the power transmitting coil 116 means a region that is surrounded by a plane containing an outer peripheral portion of the wiring line of the power transmitting coil 116 (indicated with a broken line in FIG. 6B) and by the wiring line of the power transmitting coil 116. As illustrated by dotted lines in FIG. 6C, when the position of the power receiving coil 216 is misaligned in the X direction from the power transmitting coil 116, the left-hand side portion of the power receiving coil 216 in the figure goes farther away from the power transmitting coil 116, but the right-hand side portion comes closer to the power transmitting coil 116. Therefore, as a whole, a decrease in the coupling coefficient can be reduced.

Figure 7A:
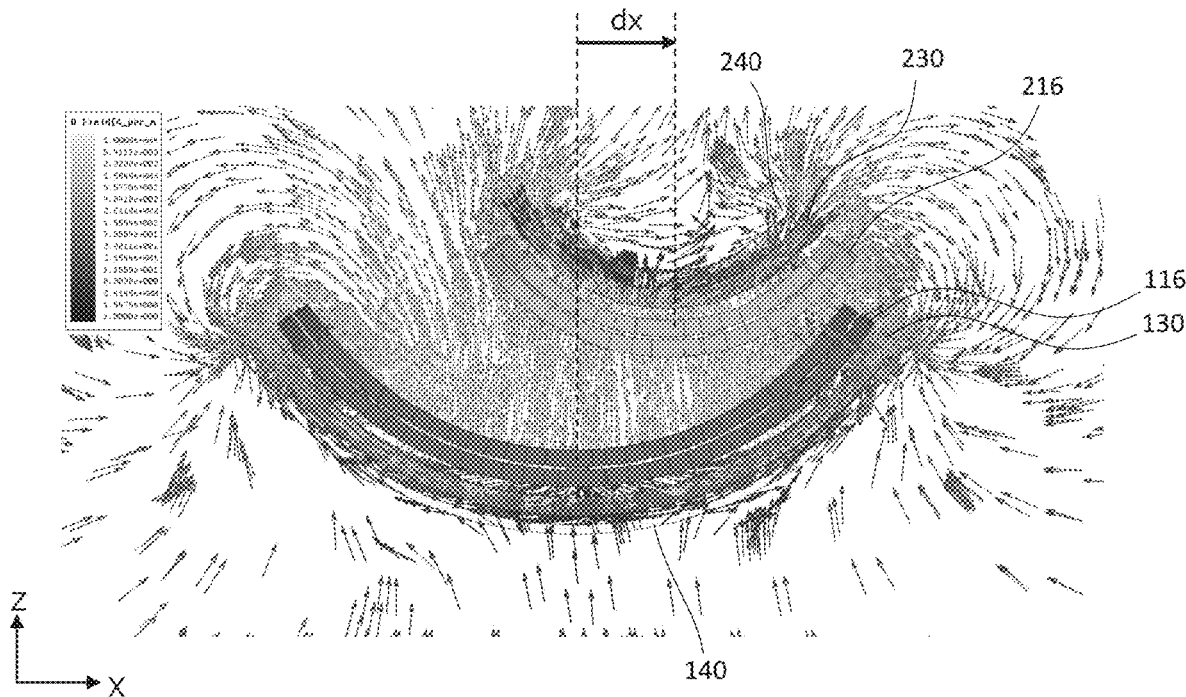
FIG. 7A A diagram showing an example spatial distribution of a magnetic field in the case where the center axis of the power receiving coil is misaligned from the center axis of the power transmitting coil in Embodiment 1.

FIG. 7A is a diagram showing an example spatial distribution of a magnetic field in the case where the center axis of the power receiving coil 216 is misaligned by dx in the x direction from the center axis of the power transmitting coil 116 in the present embodiment. The broken lines in the figure represent the respective center axes of the power transmitting coil 116 and the power receiving coil 216. FIG. 7A expresses a distribution of magnetic field intensity with arrows, where thinner arrows represent a higher magnetic field intensity. The illustrated magnetic field distribution was obtained through an electromagnetic field analysis which was performed by setting the respective dimensions, magnetic permeabilities, dielectric constants, currents or other parameters of the power transmitting coil 116, the power receiving coil 216, the magnetic shields 130 and 230, and the electrical conduction shields 140 and 240 to their actually-used values. FIG. 7A shows exemplary results where dx=10 mm. As can be seen from FIG. 7A, even if the center axis of the power transmitting coil 116 and the center axis of the power receiving coil 216 are misaligned, a high level of coupling is maintained in the right-hand side of FIG. 7A.

Figure 7B:
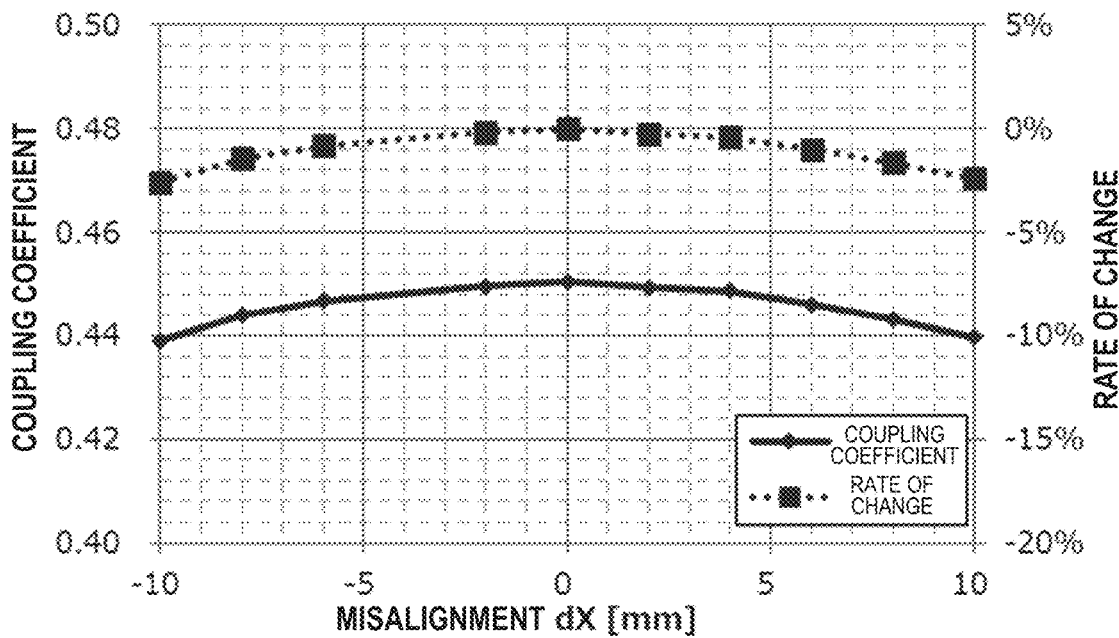
FIG. 7B A graph showing an example relationship between the coupling coefficient between the power transmitting coil and the power receiving coil and the amount of misalignment dx in Embodiment 1.

FIG. 7B is a graph showing an example relationship between the coupling coefficient between the power transmitting coil 116 and the power receiving coil 216 and the amount of misalignment dx in the present embodiment. FIG. 7B also shows a rate of change in the coupling coefficient relative to the value of the coupling coefficient of the case where dx=0. As can be seen from this graph, the decrease in the coupling efficiency relative to the increase in the absolute value of the amount of misalignment dx is reduced as compared to the example shown in FIG. 3B. For example, when a state of dx=0 mm transitions to a state of dx=10 mm, the coupling coefficient changes from 0.45 to 0.44, such that the decrease is kept as low as about 3%. Similar results are also obtained when the position of the power receiving coil 216 with respect to the power transmitting coil 116 changes in the y direction. Thus, with the configuration according to the present embodiment, the decrease in the coupling coefficient occurring when the relative positioning between the coils becomes misaligned from the proper positioning is reduced, whereby a decrease in the efficiency of power transmission can be reduced.

Thus, the power transmitting coil 116 in the present embodiment is shaped so that, during use, as viewed from the power receiving coil 216, its central portion is located beyond its outer peripheral portion. Moreover, the power receiving coil 216 is shaped so that, during use, as viewed from the power transmitting coil 116, its central portion is located in front of the outer peripheral portion. With such a structure, it is possible to reduce a decrease in the coupling efficiency between the coils when the relative positioning between the power transmitting coil 116 and the power receiving coil 216 has changed. As a result, a decrease in the efficiency of power transmission can be reduced.

The shapes of the power transmitting coil 116 and the power receiving coil 216 are not limited to the aforementioned shapes, but various other shapes are possible. Hereinafter, examples of other shapes of the power transmitting coil 116 and the power receiving coil 216 will be described.

Figure 8A:
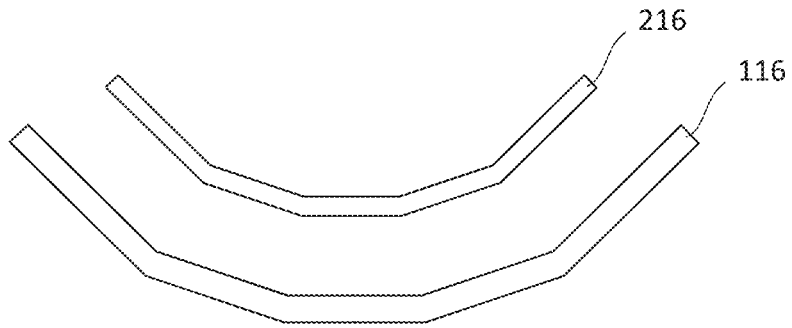
FIG. 8A A diagram showing another example of cross-sectional shapes of the power transmitting coil and the power receiving coil.
Figure 8B:
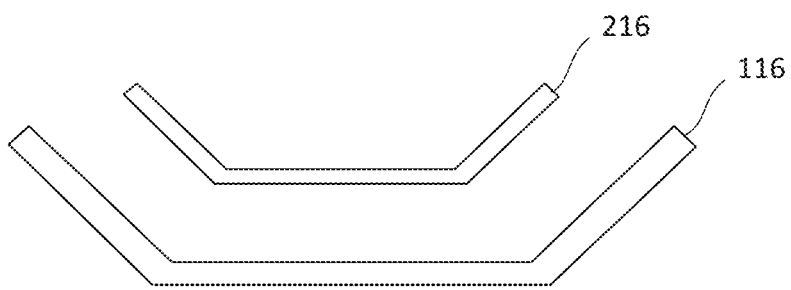
FIG. 8B A diagram showing still another example of cross-sectional shapes of the power transmitting coil and the power receiving coil.

FIG. 8A and FIG. 8B are diagrams showing other examples of cross-sectional shapes of the power transmitting coil 116 and the power receiving coil 216. In these examples, rather than a curved surface, the power transmitting coil 116 and the power receiving coil 216 have a polygonal cross-sectional structure. With such a structure, too, it is possible to reduce a decrease in the efficiency of transmission when a misalignment exists between the power transmitting coil 116 and the power receiving coil 216.

Figure 9:
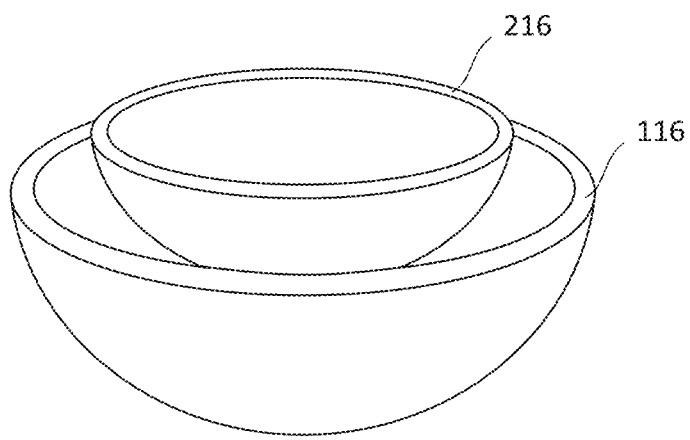
FIG. 9 A diagram showing another example of schematic shapes of the power transmitting coil and the power receiving coil.

FIG. 9 is a diagram showing another example of schematic shapes of the power transmitting coil 116 and the power receiving coil 216. In this example, each of the power transmitting coil 116 and the power receiving coil 216 is a spiral coil whose windings are wound around in a spherical manner. With such a structure, too, the aforementioned effects can be obtained.

In the present embodiment, the power receiving coil 216 is smaller in size than the power transmitting coil 116; however, the power receiving coil 216 may be equal in size to, or smaller in size than, the power transmitting coil 116.

Figure 10A:
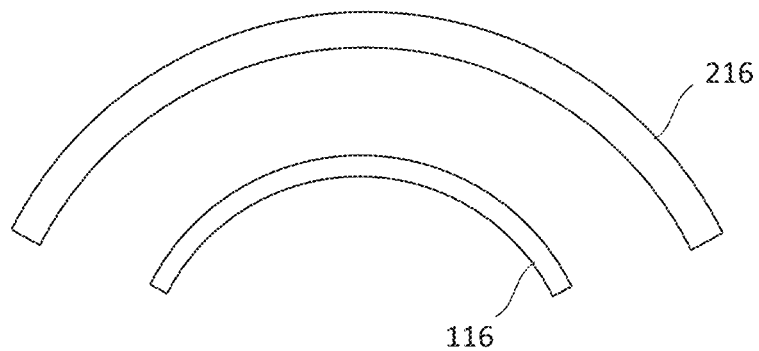
FIG. 10A A diagram showing an exemplary configuration in which the power receiving coil is larger than the power transmitting coil.
Figure 10B:
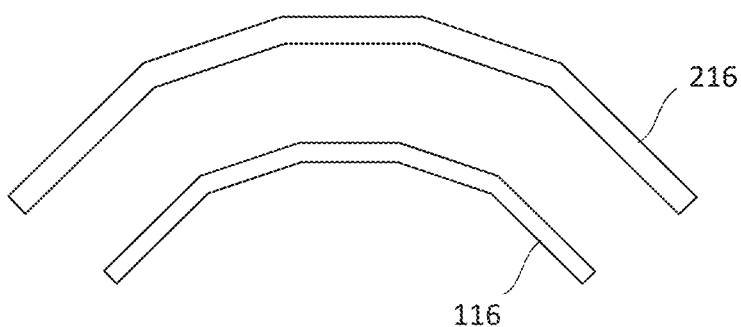
FIG. 10B A diagram showing another exemplary configuration in which the power receiving coil is larger than the power transmitting coil.
Figure 10C:
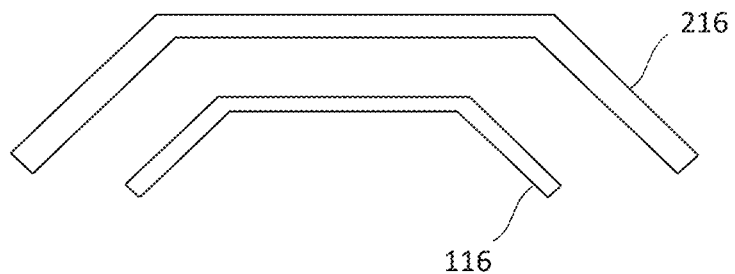
FIG. 10C A diagram showing still another exemplary configuration in which the power receiving coil is larger than the power transmitting coil.

FIGS. 10A to 10C are diagrams showing exemplary configurations in which the power receiving coil 216 is larger than the power transmitting coil 116. In the example of FIG. 10A, each of the power transmitting coil 116 and the power receiving coil 216 has a coil surface which is curved in the form of a curved surface. In the example of FIGS. 10B and 10C, each of the power transmitting coil 116 and the power receiving coil 216 has a bent coil surface presenting a polygon. As in these examples, in configurations where the power transmitting coil 116 is smaller than the power receiving coil 216, too, a decrease in the coupling efficiency when a misalignment exists between the coils can be reduced.

Next, component elements of the wireless power transmission system according to the present embodiment will be described in more detail.

Figure 11A:
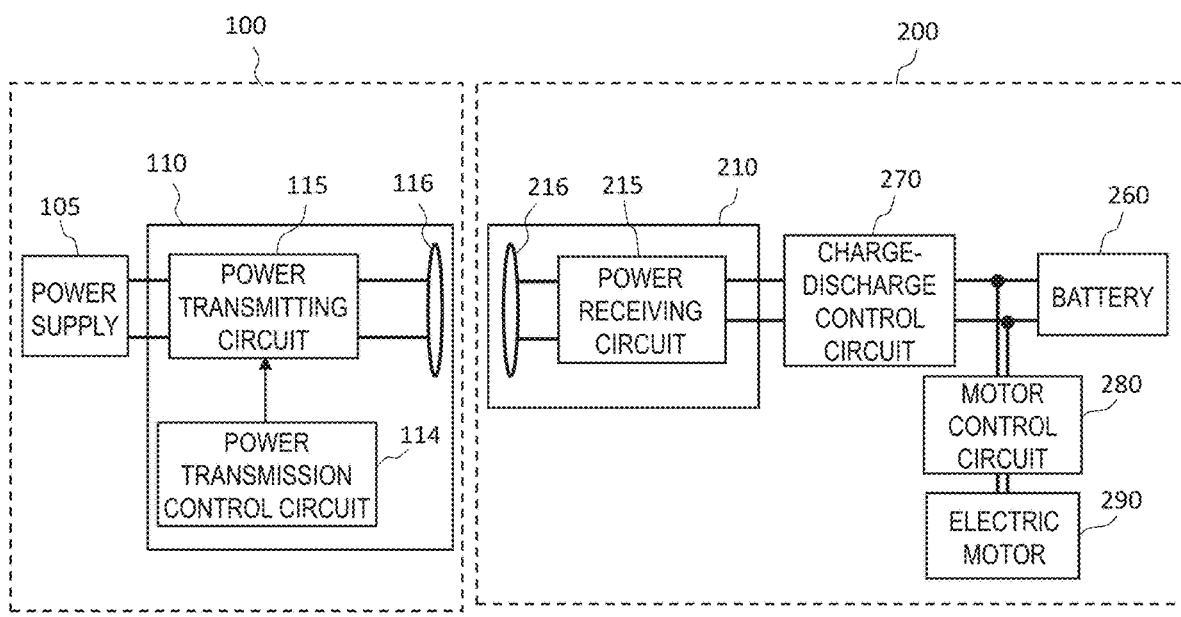
FIG. 11 A block diagram showing an exemplary configuration of a wireless power transmission system.

FIG. 11 is a block diagram showing more detailed exemplary configurations for the charging station 100 and the electric scooter 200. In addition to the power transmission unit 110, the charging station 100 in the present embodiment includes a power supply 105. The power supply 105 supplies DC power to the power transmission unit 110.

The power transmission unit 110 includes a power transmitting coil 116, a power transmitting circuit 115, and a power transmission control circuit 114. The power transmitting circuit 115 includes, for example, an inverter circuit, and converts the DC power that is supplied from the power supply 105 into AC power, for output to the power transmitting coil 116. The power transmitting coil 116 in this example includes a power transmitting coil, and sends out the AC power that is output from the power transmitting circuit 115. The power transmission control circuit 114 may be implemented as an integrated circuit, e.g., a microcontroller unit, for example. The power transmission control circuit 114 is electrically connected to the power transmitting circuit 115. The power transmission control circuit 114 controls the power transmitting circuit 115.

The electric scooter 200 shown in FIG. 11 includes a power reception unit 210, a charge-discharge control circuit 270, a battery 260, a motor control circuit 280, and an electric motor 290. The electric motor 290 is controlled by the motor control circuit 280 so as to rotate one or more driving wheels of the electric scooter 200. The charge-discharge control circuit 270 monitors the charge state of the battery 260, and controls charging and discharging.

The power reception unit 210 includes a power receiving coil 216 and a power receiving circuit 215. While the power transmitting coil 116 and the power receiving coil 216 are opposed, electric power is wirelessly transmitted from the power transmitting coil 116 to the power receiving coil 216. The power receiving circuit 215 includes a rectifier circuit that converts the electric power received by the power receiving coil 216 into DC power, for output to the charge-discharge control circuit 270.

The battery 260 is a rechargeable secondary battery, such as a lithium-ion battery or a nickel-metal hydride battery, for example. The electric scooter 200 is able to move by driving the motor 290 with the electric power that is stored in the battery 260. Instead of a secondary battery, a capacitor for electrical storage purposes may be used. For example, a high-capacitance and low-resistance capacitor, such as an electric double layer capacitor or a lithium-ion capacitor, can be used. Such capacitors also fall within the meaning of a "battery" as used in the present disclosure.

The motor 290 may be any motor, such as a permanent magnet synchronous motor, an induction motor, a stepping motor, a reluctance motor, or a DC motor, for example. The motor 290 rotates a wheel(s) of the electric scooter 200 via a transmission mechanism, e.g., shafts and gears, thus causing the electric scooter 200 to move.

The motor control circuit 280 controls the motor 290 to cause the electric scooter 200 to perform desired operations. The motor control circuit 280 may include various circuits, such as an inverter circuit, that are designed in accordance with the type of the motor 290.

Figure 12A:
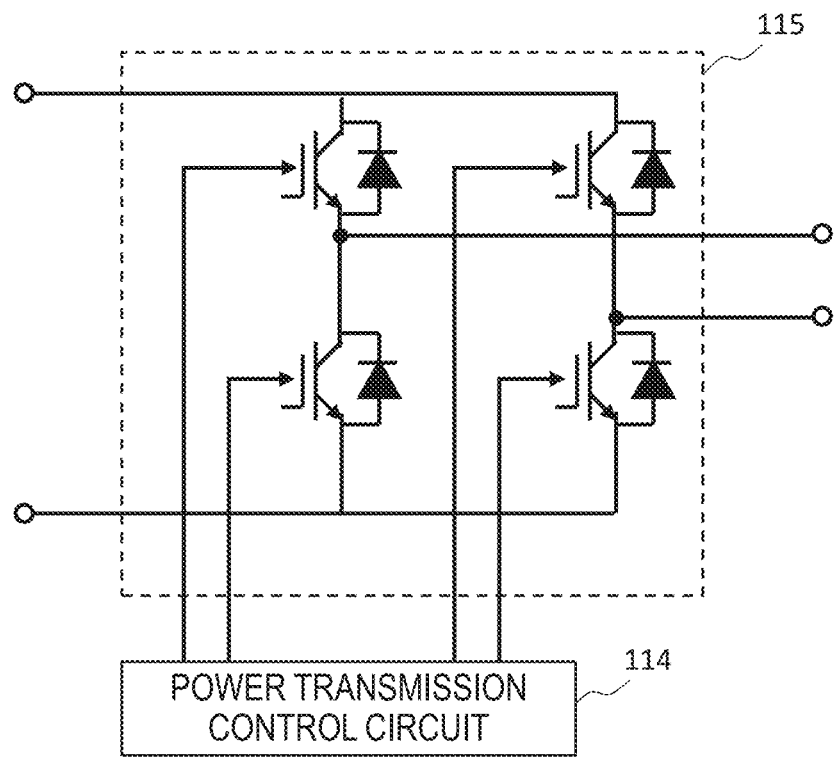
FIG. 12A A diagram schematically showing an exemplary configuration of an inverter circuit.

FIG. 12A is a diagram schematically showing an exemplary configuration for the inverter circuit included in the power transmitting circuit 115. In this example, a full-bridge inverter circuit that includes four switching elements is used. Each switching element may be a transistor switch such as an IGBT or a MOSFET. The power transmission control circuit 114 may include a gate driver which outputs a control signal to control the ON (conducting) or OFF (non-conducting) state of each switching element and a microcontroller unit (MCU) which causes the gate driver to output a control signal. Instead of the full-bridge inverter that is shown in the figure, a half-bridge inverter, or any other oscillation circuit, e.g., that of class E, may also be used.

Figure 12B:
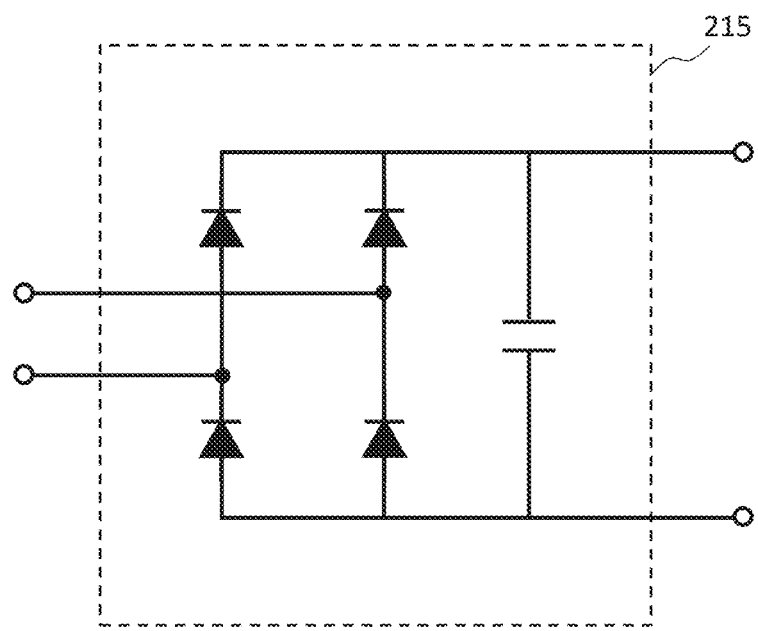
FIG. 12B A diagram schematically showing an exemplary configuration of a rectifier circuit.

FIG. 12B is a diagram schematically showing an exemplary configuration for the rectifier circuit included in the power receiving circuit 215. In this example, the rectifier circuit is a full-wave rectifier circuit including a diode bridge and a smoothing capacitor. The rectifier circuit may have any other circuit configuration than that which is shown. The rectifier circuit converts the received AC energy into DC energy which is available for use by the load, such as the battery 260.

With the above configuration, it is possible to wirelessly transmit electric power from the charging station 100 to the electric scooter 200. In the present embodiment, unlike conventional planar coils, the power transmitting coil 116 and the power receiving coil 216 have a curved shape presenting a curved surface. Therefore, even if a misalignment exists between the power transmitting coil 116 and the power receiving coil 216, it is possible to reduce a decrease in the efficiency of transmission.

Embodiment 2

Next, a wireless power supply unit according to a second embodiment of the present disclosure will be described.

Figure 13A:
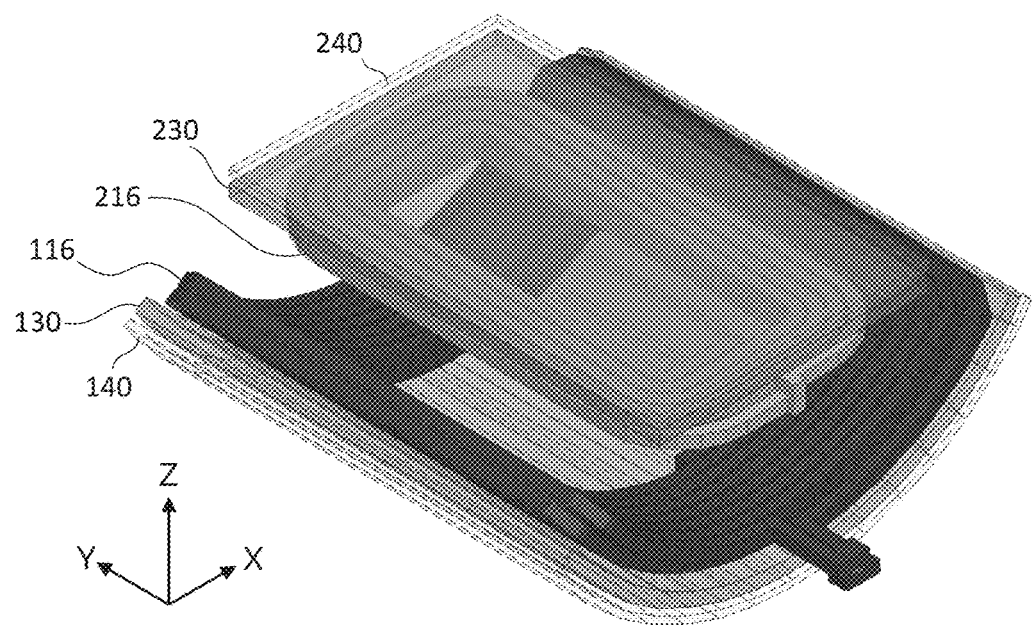
FIG. 13A A perspective view showing a wireless power supply unit according to Embodiment 2.

FIG. 13A is a perspective view showing a wireless power supply unit according to the present embodiment. In the present embodiment, the power transmitting coil 116 is a spiral coil that is curved in the form of a curved surface, but the power receiving coil 216 is a planar spiral coil. The magnetic shield 230 and the electrical conduction shield 240 of the power-receiving side have a plate-like structure. The structures of the power transmitting coil 116 and the magnetic shield 130 and the electrical conduction shield 140 of the power-transmitting side are similar to the structures in Embodiment 1.

Figure 13B:
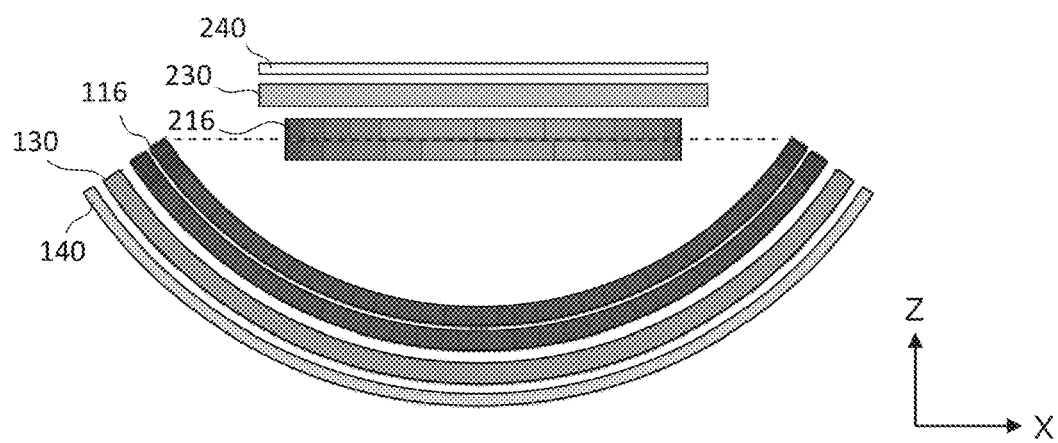
FIG. 13B A diagram showing the structure of a cross section of the wireless power supply unit shown in FIG. 13A.
Figure 13C:
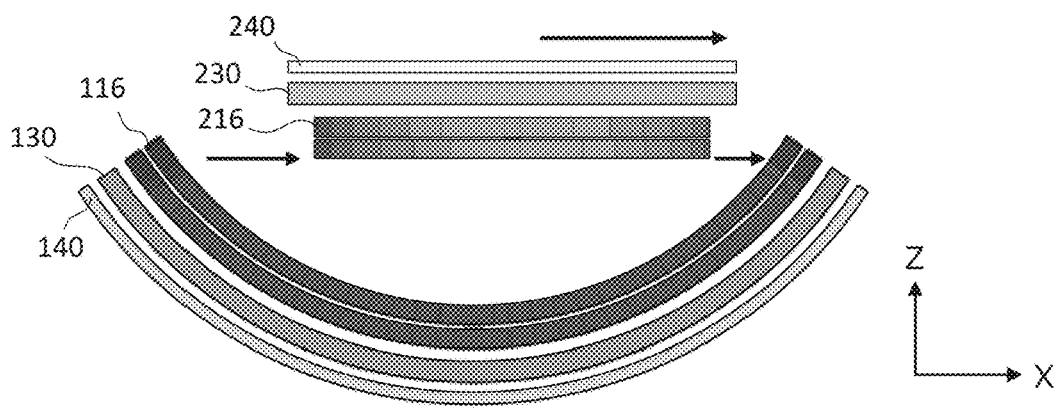
FIG. 13C A diagram showing an example state where the position of the power reception unit has changed in the X direction from the state shown in FIG. 14A A diagram showing an example spatial distribution of a magnetic field in the case where the center axis of the power receiving coil is misaligned from the center axis of the power transmitting coil in Embodiment 2.

FIG. 13B is a diagram showing the structure of a cross section of the wireless power supply unit shown in FIG. 13A. FIG. 13C is a diagram showing an example state where the position of the power reception unit 210 has changed in the X direction from the state shown in FIG. 13B. In the present embodiment, the power transmitting coil 116 is curved, but the power receiving coil 216 has a planar structure. When supplying power, at least a portion of the power receiving coil 216 is located inside a region that is defined by the wiring line of the power transmitting coil 116 (indicated with a broken line in FIG. 13B). As shown in FIG. 13C, when the position of the center axis of the power receiving coil 216 is misaligned in the X direction from the center axis of the power transmitting coil 116, the left-hand side portion of the power receiving coil 216 in the figure goes farther away from the power transmitting coil 116, but the right-hand side portion comes closer to the power transmitting coil 116. Therefore, in the present embodiment, too, a decrease in the coupling coefficient can be reduced as a whole.

Figure 14A:
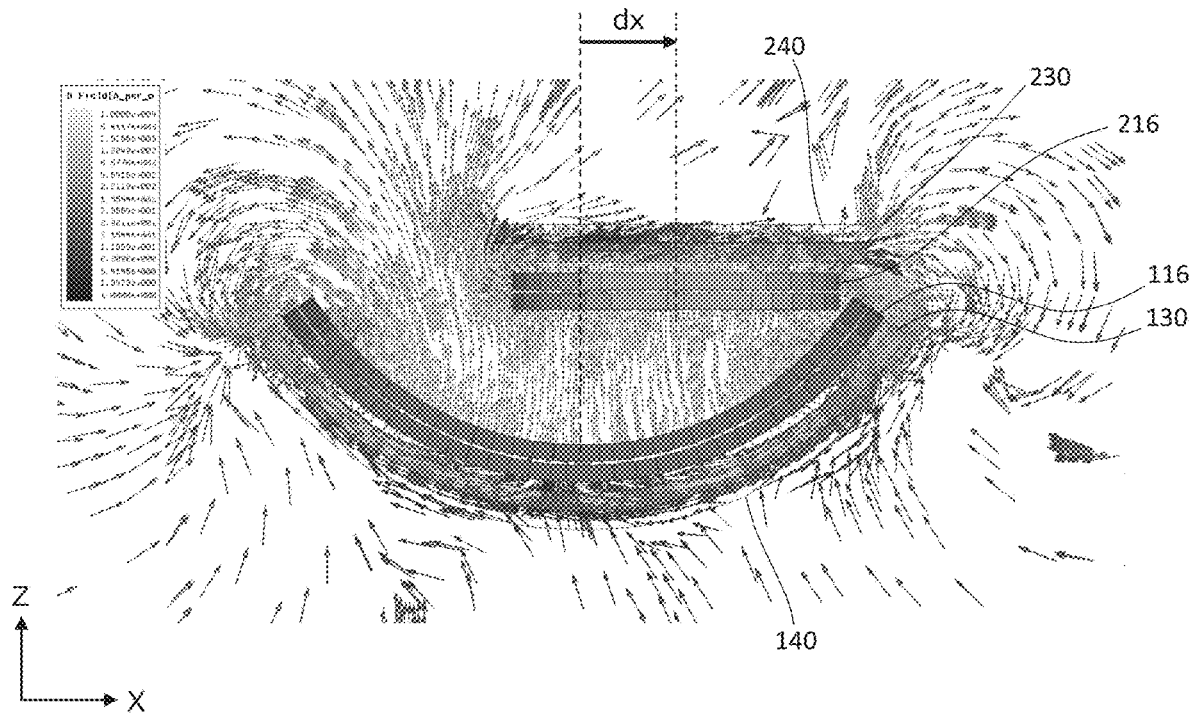
FIG. 14B A graph showing an example relationship between the coupling coefficient between the power transmitting coil and the power receiving coil and the amount of misalignment dx in Embodiment 2.

FIG. 14A is a diagram showing an example spatial distribution of a magnetic field in the case where the center axis of the power receiving coil 216 is misaligned by dx in the x direction from the center axis of the power transmitting coil 116 in the present embodiment. As can be seen from FIG. 14A, even if the center axis of the power transmitting coil 116 and the center axis of the power receiving coil 216 are misaligned, a high level of coupling is maintained in the right-hand side of FIG. 14A.

Figure 14B:
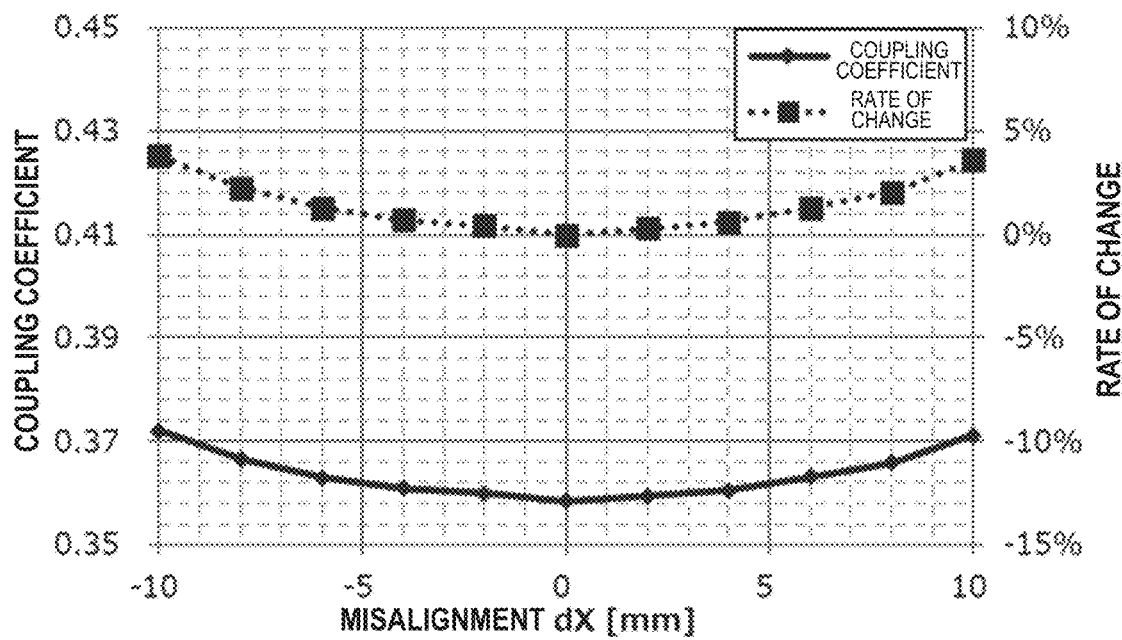

FIG. 14B is a graph showing an example relationship between the coupling coefficient between the power transmitting coil 116 and the power receiving coil 216 and the amount of misalignment dx in the present embodiment. FIG. 14B also shows a rate of change in the coupling coefficient relative to the value of the coupling coefficient of the case where dx=0. As can be seen from this graph, the decrease in the coupling efficiency relative to the increase in the absolute value of the amount of misalignment dx is reduced as compared to the example shown in FIG. 3B. Similar results are also obtained when the position of the power receiving coil 216 with respect to the power transmitting coil 116 changes in the y direction. Thus, with the configuration according to the present embodiment, too, the decrease in the coupling coefficient occurring when the relative positioning between the coils becomes misaligned from the proper positioning is reduced. As a result, a decrease in the efficiency of power transmission can be reduced.

Figure 15A:
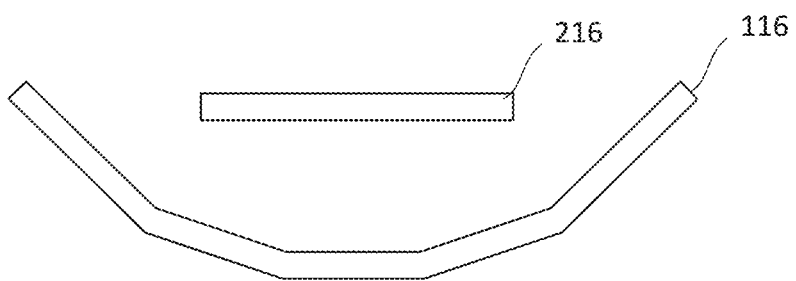
FIG. 15A A diagram showing another example of cross-sectional shapes of the power transmitting coil and the power receiving coil.
Figure 15B:
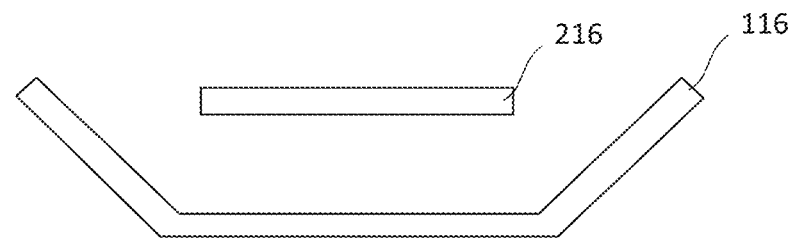
FIG. 15B A diagram showing still another example of cross-sectional shapes of the power transmitting coil and the power receiving coil.

In the present embodiment, too, the shape of the power transmitting coil 116 is not limited to the illustrated shape of a curved surface. For example, as shown in FIG. 15A and FIG. 15B, the power transmitting coil 116 may have a bent cross-sectional shape presenting a polygon.

Figure 16A:
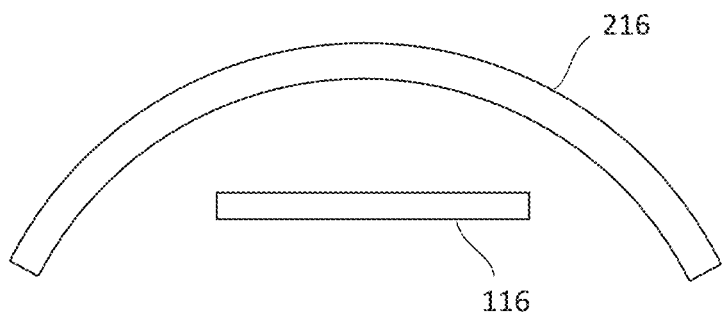
FIG. 16A A diagram showing an exemplary configuration in which the power receiving coil is larger than the power transmitting coil.
Figure 16B:
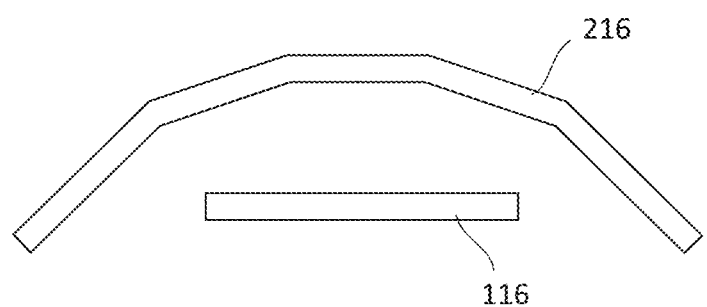
FIG. 16B A diagram showing another exemplary configuration in which the power receiving coil is larger than the power transmitting coil.
Figure 16C:
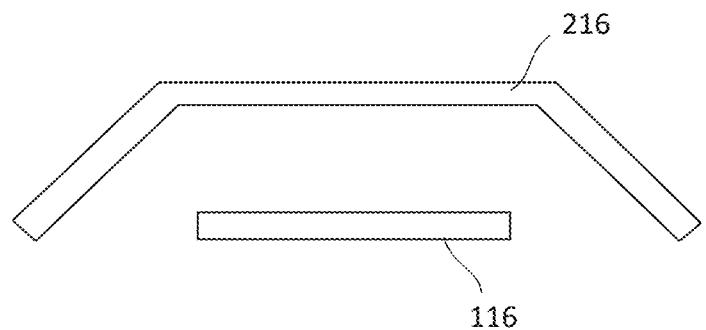
FIG. 16C A diagram showing still another exemplary configuration in which the power receiving coil is larger than the power transmitting coil.

In the present embodiment, the power transmitting coil 116 is larger than the power receiving coil 216, but the power receiving coil 216 may be equal in size to, or larger in size than, the power transmitting coil 116. For example, in the example shown in FIG. 16A, the power transmitting coil 116 is a planar spiral coil, and is smaller than the power receiving coil 216. In this example, the power receiving coil 216 has a curved structure presenting a curved surface. With such a structure, too, the aforementioned effects can be obtained. As shown in FIG. 16B and FIG. 16C, the power receiving coil 216 may have a polygonal cross-sectional structure.

Next, another example of the structures of the magnetic shields 130 and 230 and the electrical conduction shields 140 and 240 will be described.

Figure 17A:
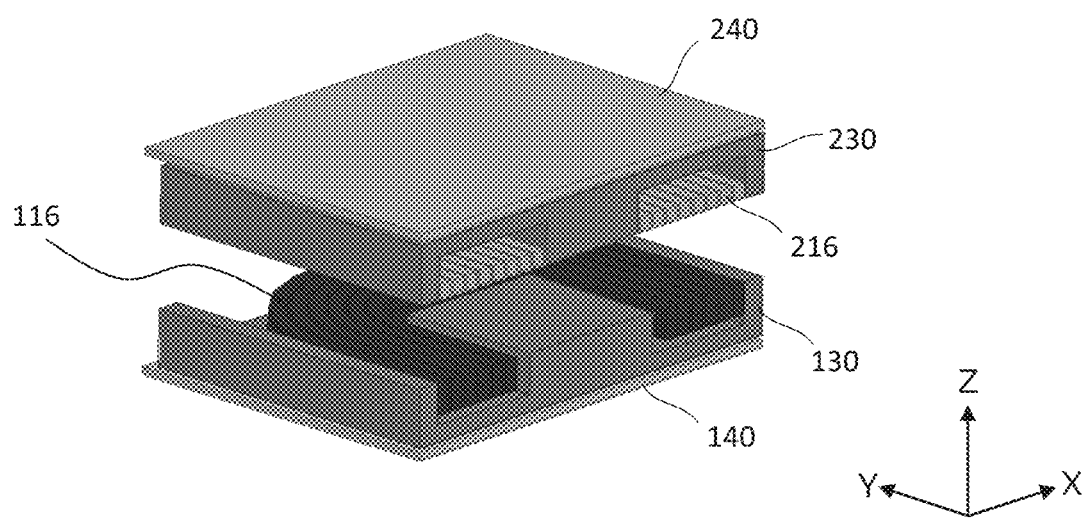
FIG. 17A A diagram showing a variation of the wireless power supply unit.

FIG. 17A is a diagram showing an example of a wireless power supply unit that includes plate-like electrical conduction shields 140 and 240 and magnetic shields 130 and 230 having grooves for respectively accommodating the coils 116 and 216. Although the example of FIG. 17A illustrates that both of the power transmitting coil 116 and the power receiving coil 216 are planar coils, one of these may have a curved structure presenting a curved surface, or a bent structure presenting a polygon.

Figure 17B:
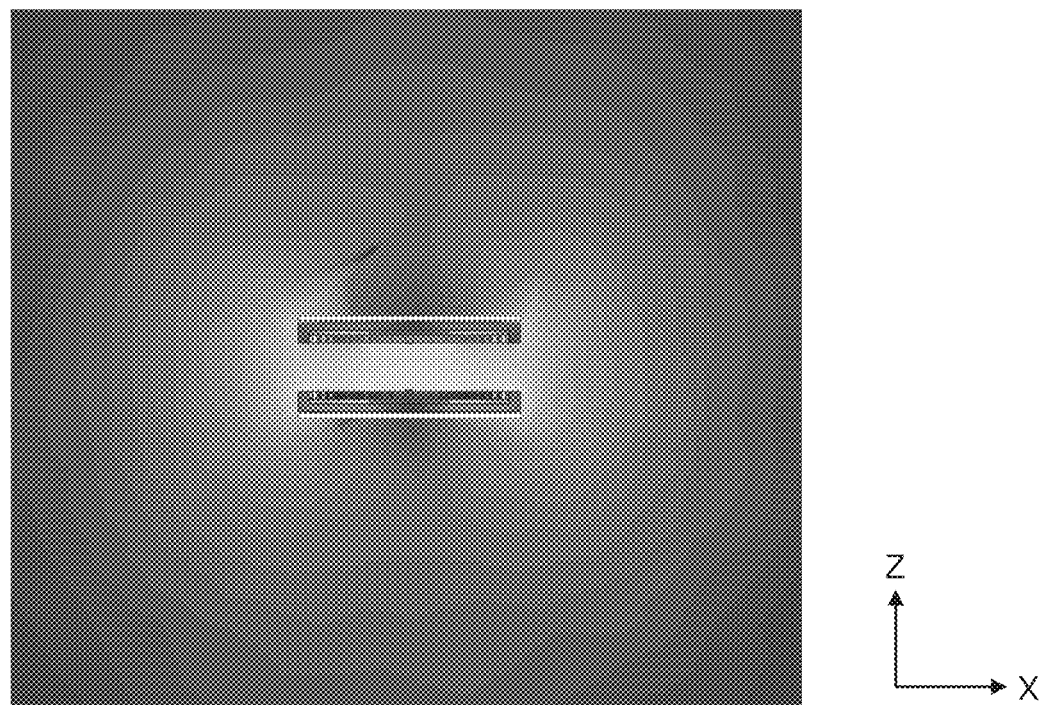
FIG. 17B A diagram showing an example distribution of magnetic field intensity around the wireless power supply unit shown in FIG. 17A.

FIG. 17B is a diagram showing an example distribution of magnetic field intensity around the wireless power supply unit in this example. In the figure, regions which appear lighter represent higher magnetic field intensities. Providing the electrical conduction shields 140 and 240 achieves an effect of reducing the magnetic field intensity around the wireless power supply unit.

Figure 18A:
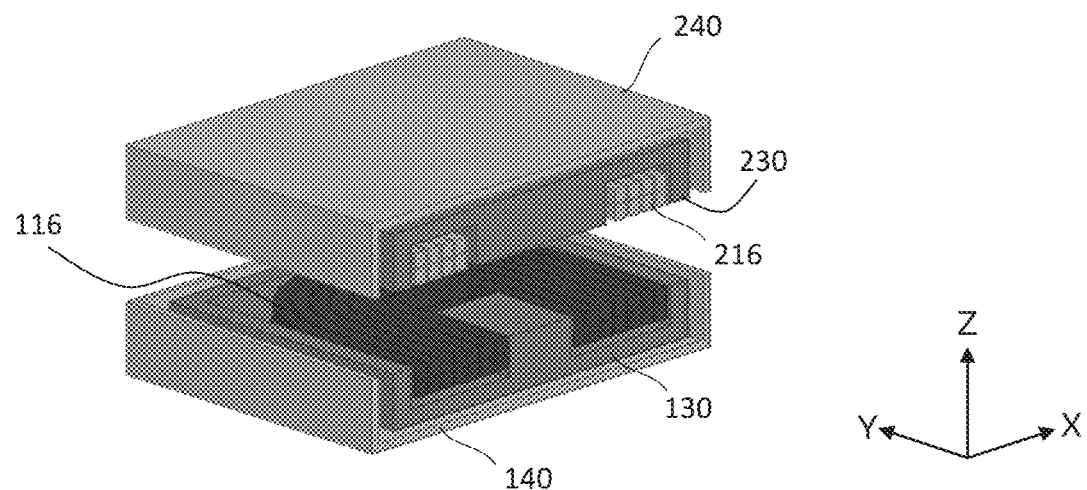
FIG. 18A A diagram showing another variation of the wireless power supply unit.

FIG. 18A is a diagram showing an example of a wireless power supply unit in which the electrical conduction shields 140 and 240 have a box-like structure. The structures of the power transmitting coil 116, the power receiving coil 216, and the magnetic shields 130 and 230 are identical to the structures shown in FIG. 17A. In the example shown in FIG. 18A, the electrical conduction shield 140 at least partially surrounds the power transmitting coil 116 and the magnetic shield 130. Similarly, the electrical conduction shield 240 at least partially surrounds the power transmitting coil 116 and the magnetic shield 230. With such a structure, a leaking magnetic field around the wireless power supply unit can be further reduced. In this example, too, at least one of the power transmitting coil 116 and the power receiving coil 216 may have a curved structure presenting a curved surface or a bent structure presenting a polygon as aforementioned.

Figure 18B:
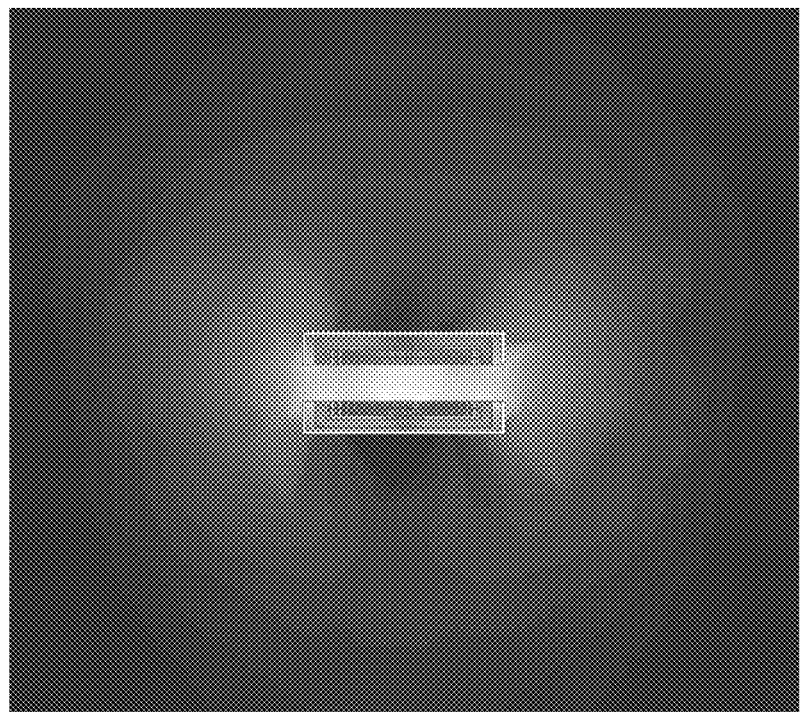
FIG. 18B A diagram showing an example distribution of magnetic field intensity of the wireless power supply unit shown in FIG. 18A.

FIG. 18B is a diagram showing an example distribution of magnetic field intensity around the wireless power supply unit in the example of FIG. 18A. It can be seen that providing the box-like electrical conduction shields 140 and 240 further reduces the magnetic field intensity around the wireless power supply unit.

In each of the above embodiments, each of the magnetic shields 130 and 230 and the electrical conduction shields 140 and 240 is not an essential component element, but may be provided as needed. Only one of the magnetic shields 130 and 230 may be provided. Similarly, only one of the electrical conduction shields 140 and 240 may be provided.

The above embodiments have described examples of applying the technique of the present disclosure to the purpose of charging the electric scooter 200. Without being limited to such applications, the technique of the present disclosure is applicable to the purpose of wirelessly supplying power to any arbitrary device that operates with electric power.

INDUSTRIAL APPLICABILITY

The technique of the present disclosure is applicable to a system that includes a power transmitting device and a power receiving device to operate with electric power which is wirelessly transmitted from the power transmitting device.

REFERENCE SIGNS LIST 100 charging station
105 power supply
110 power transmission unit
114 power transmission control circuit
115 power transmitting circuit
116 power transmitting coil
130 magnetic shield
140 electrical conduction shield
200 electric scooter
202 shaft of electric vehicle
210 power reception unit
215 power receiving circuit
216 power receiving coil
220 circuit board
230 magnetic shield
240 electrical conduction shield
250 cover
260 battery
280 motor control circuit
282 load
290 electric motor

The invention claimed is:

1. A wireless power supply unit comprising:
a power transmitting coil; and
a power receiving coil that wirelessly receives electric power from the power transmitting coil, wherein:
a first coil is one of the power transmitting coil or the power receiving coil and has a first central portion and a first outer peripheral portion, and a second coil is another of the power transmitting coil or the power receiving coil,
the first coil includes a first recess surrounded by the first central portion and the first outer peripheral portion, and
the first coil is shaped so that, when coupled with the second coil to wirelessly transmit the power, the first central portion is located farther away from the second coil than the first outer peripheral portion thereof, when viewed from the second coil, and the second coil is disposed inside the first recess.

2. The wireless power supply unit of claim 1, wherein:
the second coil has a second central portion and a second outer peripheral portion, and
the second coil is shaped so that, when coupled with the second coil to wirelessly transmit the power, the second central portion is located in front of the second outer peripheral portion, as viewed from the first coil.

3. The wireless power supply unit of claim 2, wherein:
the second coil includes a second recess surrounded by the second central portion and the second outer peripheral portion, and
the second central portion is disposed within the interior of the first recess.

4. The wireless power supply unit of claim 1, wherein:
the second coil has a second central portion and a second outer peripheral portion, and
when coupled with the second coil to wirelessly transmit the power, at least the second central portion of the second coil is located beyond the first central portion of the first coil and in front of the first outer peripheral portion of the first coil, as viewed from the first coil.

5. The wireless power supply unit of claim 1, wherein the second coil is equal in size to, or smaller in size than, the first coil.

6. The wireless power supply unit of claim 1, wherein the first coil has a curved shape presenting a curved surface.

7. The wireless power supply unit of claim 1, wherein the second coil has a curved shape presenting a curved surface.

8. The wireless power supply unit of claim 1, wherein:
the first coil is the power transmitting coil, and
the second coil is the power receiving coil.

9. The wireless power supply unit of claim 1, further comprising at least one of:
a first magnetic shield that is disposed at an opposite side of the first coil to a side where the second coil is located; or
a second magnetic shield that is disposed at an opposite side of the second coil to a side where the first coil is located.

10. The wireless power supply unit of claim 9, wherein:
at least one of the first coil or the second coil has a curved shape presenting a curved surface, and
the at least one of the first magnetic shield or the second magnetic shield has a shape that is curved along the first coil or the second coil.

11. The wireless power supply unit of claim 1, further comprising at least one of:
a first electrical conduction shield that is disposed at an opposite side of the first coil to a side where the second coil is located; or
a second electrical conduction shield that is disposed at an opposite side of the second coil to a side where the first coil is located.

12. The wireless power supply unit of claim 11, wherein:
at least one of the first coil or the second coil has a curved shape presenting a curved surface, and
the at least one of the first electrical conduction shield or the second electrical conduction shield has a shape that is curved along the first coil or the second coil.

13. The wireless power supply unit of claim 11, wherein the at least one of the first electrical conduction shield or the second electrical conduction shield has a box-like structure covering the first coil or the second coil.

14. The wireless power supply unit of claim 1, further comprising a power transmitting circuit to supply AC power to the power transmitting coil.

15. The wireless power supply unit of claim 1, further comprising a power receiving circuit to convert the electric power received by the power receiving coil into another form of electric power and to supply the other form of electric power to a load.

16. A wireless power transmission system comprising:
- a power transmitting device comprising a power transmitting coil; and
- an electric vehicle comprising a power receiving coil, wherein:
- the power receiving coil wirelessly receives electric power from the power transmitting coil,
- a first coil is one of the power transmitting coil or the power receiving coil and has a first central portion and a first outer peripheral portion, and a second coil is another of the power transmitting coil or the power receiving coil,
- the first coil includes a first recess surrounded by the first central portion and the first outer peripheral portion,
- the first coil is shaped so that, when coupled with the second coil to wirelessly transmit the power, the first central portion is located farther away from the second coil than the first outer peripheral portion thereof, when viewed from the second coil, and the second coil is disposed inside the first recess.

\* \* \* \* \*